(12) United States Patent
Wu et al.

(10) Patent No.: US 11,783,501 B2
(45) Date of Patent: Oct. 10, 2023

(54) METHOD AND APPARATUS FOR DETERMINING IMAGE DEPTH INFORMATION, ELECTRONIC DEVICE, AND MEDIA

(71) Applicant: Beijing Baidu Netcom Science Technology Co., Ltd., Beijing (CN)

(72) Inventors: Ge Wu, Beijing (CN); Yu Zhou, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 0 days.

(21) Appl. No.: 17/986,244

(22) Filed: Nov. 14, 2022

(65) Prior Publication Data

US 2023/0260144 A1    Aug. 17, 2023

(30) Foreign Application Priority Data

Feb. 11, 2022  (CN) .......................... 202210129100.9

(51) Int. Cl.
  *G06T 7/55*    (2017.01)
  *G06T 3/40*    (2006.01)

(52) U.S. Cl.
  CPC .............. *G06T 7/55* (2017.01); *G06T 3/4007* (2013.01); *G06T 2207/10028* (2013.01)

(58) Field of Classification Search
  CPC  G06T 7/55; G06T 3/4007; G06T 2207/10028
  See application file for complete search history.

(56) References Cited

U.S. PATENT DOCUMENTS 10,699,421 B1    6/2020  Cherevatsky et al.
2015/0319424 A1*  11/2015  Haimovitch-Yogev ......................
                                      G06T 11/003
                                              348/48

(Continued)

FOREIGN PATENT DOCUMENTS

CN    102750711 A    10/2012
CN    102842148 A    12/2012

(Continued)

OTHER PUBLICATIONS

Fuhrmann, S., Langguth, F., Moehrle, N., Waechter, M. and Goesele, M., 2015. MVE—An image-based reconstruction environment. Computers & Graphics, 53, pp. 44-53.*

(Continued)

*Primary Examiner* — Zhitong Chen
(74) *Attorney, Agent, or Firm* — Norton Rose Fulbright US LLP; James R. Crawford

(57) ABSTRACT

Provided are a method and apparatus for determining image depth information, an electronic device, and a medium. The method includes: acquiring first depth information of pixels in a target image output by a first prediction layer; generating the point cloud model of the target image according to the first depth information, and determining initial depth information of the pixels in the target image in a second prediction layer according to the point cloud model; and performing propagation optimization according to the initial depth information, and determining second depth information of the pixels in the target image output by the second prediction layer, where the first prediction layer is configured before the second prediction layer.

18 Claims, 6 Drawing Sheets

(56) References Cited

U.S. PATENT DOCUMENTS

| | | | |
|---|---|---|---|
| 2021/0150747 A1 | 5/2021 | Liu et al. | |
| 2022/0012903 A1 | 1/2022 | Vyas et al. | |

FOREIGN PATENT DOCUMENTS

| | | | | |
|---|---|---|---|---|
| CN | 108038905 B | * | 12/2018 | ............ G06T 17/00 |
| CN | 109215126 A | | 1/2019 | |
| CN | 109345621 A | | 2/2019 | |
| CN | 109685141 A | | 4/2019 | |
| CN | 110119698 A | | 8/2019 | |
| CN | 110223383 A | | 9/2019 | |
| CN | 111079765 A | | 4/2020 | |
| CN | 111340867 A | | 6/2020 | |
| CN | 111815757 A | | 10/2020 | |
| CN | 113034567 A | | 6/2021 | |
| CN | 113160420 A | | 7/2021 | |
| CN | 113205605 A | | 8/2021 | |
| KR | 20210108283 A | | 9/2021 | |
| WO | 2022000458 A1 | | 1/2022 | |

OTHER PUBLICATIONS

Fuhrmann, S. and Goesele, M., 2011. Fusion of depth maps with multiple scales. ACM Transactions on Graphics (TOG), 30(6), pp. 1-8.*

Chenrui Du: "Research on Key Technologies of Multi Perspective 3D Reconstruction Based on Intelligent Devices," (2019), www.cnki.net, pp. 1-70, with English Abstract.

First Search Report dated Jun. 7, 2023 by the CIPO in the corresponding Patent Application No. 202210129100.9, with English translation.

First Office Action dated Jun. 12, 2023 by the CIPO in the corresponding Patent Application No. 202210129100.9, with English translation.

Partial European search Report dated Jul. 7, 2023 in the corresponding Patent Application No. 22209418.7-1210.

Ge, et al.: "3D Convolutional Neural Networks for Efficient and Robust Hand Pose Estimation from Single Depth Images," 2017 IEEE Conference on Computer Vision and Pattern Recognition, XP33249928A, IEEE computer society, pp. 5679-5688.

Baradad and Torralba: "Height and Uprightness Invariance for 3D Prediction from a Single View," 2020 IEEE/CVF Conference on Computer Vision and Pattern Recognition (CVPR), XP33804696A, pp. 488-497.

* cited by examiner

METHOD AND APPARATUS FOR DETERMINING IMAGE DEPTH INFORMATION, ELECTRONIC DEVICE, AND MEDIA

CROSS-REFERENCE TO RELATED APPLICATION(S)

This application claims priority to Chinese Patent Application No. 202210129100.9 filed Feb. 11, 2022, the disclosure of which is incorporated herein by reference in its entirety.

TECHNICAL FIELD

The present disclosure relates to the technical field of image processing and, in particular, to the technical fields of three-dimensional point cloud, cloud computing, and cloud services, especially a method and apparatus for determining image depth information, an electronic device, and a medium.

BACKGROUND

Multi-view stereo vision has always been a hot topic in computer vision research. The purpose of the multi-view stereo vision is to establish a dense three-dimensional point cloud reconstruction result according to the correspondence relationship of images of multiple known camera poses.

The multi-view stereo vision generally uses two steps to reconstruct three-dimensional point cloud. Firstly, a depth map is estimated for each image. Then, these depth maps are fused to obtain a uniform point cloud representation. How to estimate these depth maps is the key to the process.

SUMMARY

The present disclosure provides a method, an apparatus, an electronic device, and a medium, which are configured to improve the accuracy and completeness of determining image depth information.

According to an aspect of the present disclosure, a method for determining image depth information is provided. The method includes the following steps.

First depth information of pixels in a target image output by a first prediction layer is acquired.

The point cloud model of the target image is generated according to the first depth information. Initial depth information of the pixels in the target image in a second prediction layer is determined according to the point cloud model.

Propagation optimization is performed according to the initial depth information. Second depth information of the pixels in the target image output by the second prediction layer is determined.

The first prediction layer is configured before the second prediction layer.

According to another aspect of the present disclosure, an apparatus for determining image depth information is provided. The apparatus includes a first depth information acquisition module, an initial depth information determination module, and a second depth information determination module.

The first depth information acquisition module is configured to acquire first depth information of pixels in a target image output by a first prediction layer.

The initial depth information determination module is configured to generate the point cloud model of the target image according to the first depth information and determine initial depth information of the pixels in the target image in a second prediction layer according to the point cloud model.

The second depth information determination module is configured to perform propagation optimization according to the initial depth information and determine second depth information of the pixels in the target image output by the second prediction layer.

The first prediction layer is configured before the second prediction layer.

According to another aspect of the present disclosure, an electronic device is provided. The electronic device includes at least one processor and a memory communicatively connected to the at least one processor.

The memory stores instructions executable by the at least one processor to enable the at least one processor to execute the method in the present disclosure.

According to another aspect of the present disclosure, a non-transitory computer-readable storage medium storing computer instructions is provided. The computer instructions are used for causing a computer to execute the method in the present disclosure.

According to another aspect of the present disclosure, a computer program product is provided. The computer program product includes a computer program which, when executed by a processor, implements the method in the present disclosure.

It is to be understood that the content described in this part is neither intended to identify key or important features of embodiments of the present disclosure nor intended to limit the scope of the present disclosure. Other features of the present disclosure are apparent from the description provided hereinafter.

BRIEF DESCRIPTION OF DRAWINGS

The drawings are intended to provide a better understanding of the solution and not to limit the present disclosure.

DETAILED DESCRIPTION

Example embodiments of the present disclosure, including details of embodiments of the present disclosure, are described hereinafter in conjunction with drawings to facilitate understanding. The example embodiments are illustrative only. Therefore, it is to be appreciated by those of ordinary skill in the art that various changes and modifications may be made to the embodiments described herein without departing from the scope and spirit of the present disclosure. Similarly, description of well-known functions and constructions is omitted hereinafter for clarity and conciseness.

During the research and development process, an applicant has found that when the display quality of an image is poor, for example, there are problems such as weak texture, occlusion, or reflection of the image, the existing method cannot accurately and completely determine the depth information of each pixel in the image, so the depth map of the image often has holes with large area. As a result, the subsequent three-dimensional point cloud obtained according to the reconstruction of the depth map has a poor effect.

Therefore, how to determine the depth information of an image completely and accurately remains an urgent problem to be solved.

Figure 1:
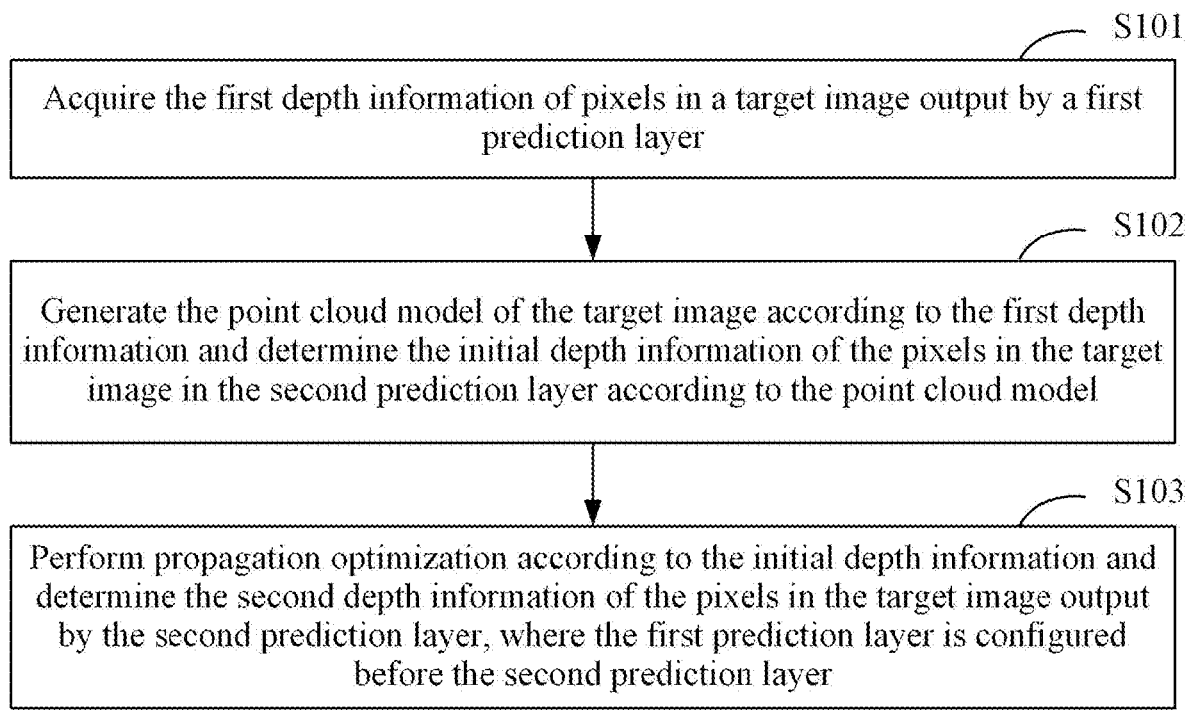
FIG. 1 is a flowchart of a method for determining image depth information according to an embodiment of the present disclosure.

FIG. 1 is a flowchart of a method for determining image depth information according to an embodiment of the present disclosure. This embodiment may be applied in the case of determining depth information for each pixel in an image. The method in this embodiment may be executed by an apparatus for determining image depth information according to an embodiment of the present disclosure. The apparatus may be implemented by software and/or hardware and integrated in any electronic device having a computing capability.

As shown in FIG. 1, the method for determining image depth information disclosed in this embodiment may include the following steps.

In S101, first depth information of pixels in a target image output by a first prediction layer is acquired.

The target image represents a photographed image obtained by a camera through photographing an object that needs to be performed three-dimensional point cloud reconstruction. Generally, photographed images are photographed by the camera in different positions and poses. The target image may be an image photographed by the camera in any position and pose. Types of the target image include, but are not limited to, an RGB image, an HSV image, and a CMY image. This embodiment does not limit the specific type of the target image. The depth information of a pixel includes the depth value of the pixel and the depth direction of the pixel. The depth value of the pixel represents digits used to store the pixel. The depth direction of the pixel represents the normal vector direction of the pixel.

A prediction layer represents a set of algorithm steps used to predict the depth information of pixels in the target image. In this embodiment, at least two prediction layers are provided. Each prediction layer outputs the depth information of the pixels in the target image once. The depth information is inputted to the prediction layer after each prediction layer to assist prediction until the last prediction layer outputs the final predicted depth information. The first prediction layer represents any prediction layer other than the last prediction layer. For example, if N (N≥2) prediction layers are provided in total, the first prediction layer may be any one of 1 layer, . . . , or N−1 layer.

In an embodiment, if the first prediction layer is the first layer, the first depth information may be output in a manner including the following steps.

An image sequence obtained by collecting the same object is acquired. All images in the image sequence are performed point cloud reconstruction by using a sparse reconstruction algorithm to generate a sparse point cloud model. Each point in the sparse point cloud model is projected into the target image in the image sequence. Projection pixels are triangulated and performed linear interpolation in the target image to determine the initial depth information of the pixels in the target image in the first prediction layer. Propagation optimization is performed according to the initial depth information to obtain optimization depth information after performing optimization on the initial depth information. The optimization depth information is used as the first depth information of the pixels in the target image output by the first prediction layer.

The first depth information of the pixels in the target image output by the first prediction layer is acquired, thereby a data foundation is laid for subsequently determining the initial depth information of the pixels in the target image in a second prediction layer.

In S102, the point cloud model of the target image is generated according to the first depth information. The initial depth information of the pixels in the target image in the second prediction layer is determined according to the point cloud model.

The second prediction layer represents any prediction layer other than the first prediction layer. For example, if N (N≥2) prediction layers are provided in total, the second prediction layer may be any one of 2 layer, . . . , or N layer. The point cloud model of the target image represents the three-dimensional point cloud formed by pixels in the target image in a world coordinate system. The initial depth information represents an initial iterative value in each prediction layer set by the pixels in the target image and is configured for subsequent propagation optimization in each prediction layer to obtain the final output depth information.

In an embodiment, after the first depth information of the pixels in the target image output by the first prediction layer is acquired, the image coordinate information of the pixels in the target image and the intrinsics information of a camera that collects the target image are acquired, and the matrix product between the first depth information and the image coordinate information is determined. Then, the world coordinate information of the pixels in the target image in the world coordinate system is determined according to the matrix ratio between the matrix product and the intrinsics information, and the point cloud model of the target image is generated according to the world coordinate information. Finally, each point in the point cloud model of the target image is projected into the target image. Projection pixels are triangulated and performed linear interpolation in the target image to determine the initial depth information of the pixels in the target image in the second prediction layer.

The initial depth information of the pixels in the target image in the second prediction layer is determined according to the first depth information output by the first prediction layer. Since the initial depth information of the second prediction layer is developed based on the first depth information output by the first prediction layer, better initial depth information can be obtained.

In S103, propagation optimization is performed according to the initial depth information, and the second depth information of the pixels in the target image output by the second prediction layer is determined. The first prediction layer is configured before the second prediction layer.

In an embodiment, the best match image corresponding to the target image in the image sequence is determined, and the correspondence relationship between pixels in the target image and pixels in the match image is determined. According to the initial depth information of each pixel in the target image and the similarity between corresponding pixels in the target image and the match image, the initial depth information of each pixel is performed propagation optimization. The propagation optimization may include three processes: space propagation, plane propagation, and view propagation.

During the space propagation process, the current initial depth information of the current pixel in the target image and the adjacent initial depth information of the adjacent pixel of the current pixel in the target image are determined. The match pixel in the match image corresponding to the current pixel is determined. Then, the similarity between the current pixel and the match pixel is determined when the current pixel has the current initial depth information and when the current pixel has the adjacent initial depth information. The initial depth information corresponding to the maximum similarity is selected as the optimization depth information after optimization of the current pixel. The current pixel represents any pixel in the target image.

During the plane propagation process, a depth information interval is determined according to the optimization depth information of the current pixel. When the current pixel is each piece of depth information in the depth information interval, the similarity between the current pixel and the match pixel is determined through traverse. The initial depth information corresponding to the maximum similarity is selected as the second depth information of the current pixel output by the second prediction layer.

All pixels in the target image are traversed through the space propagation and the plane propagation to determine the second depth information of the pixels in the target image output by the second prediction layer.

During the view propagation process, the second depth information of the pixels in the target image obtained through the space propagation and the plane propagation is assigned to corresponding pixels in the match image. Thus, the depth information of the match image does not need to be predicted, thereby improving the efficiency of determining the depth information of pixels in each image in the image sequence.

After the second depth information of the pixels in the target image output by the second prediction layer is determined, if the second prediction layer is not the last prediction layer, continuing according to the second depth information, the initial depth information of the pixels in the target image in the prediction layer after the second prediction layer is determined until the last prediction layer obtains the output depth information.

In the present disclosure, the first depth information of the pixels in the target image output by the first prediction layer is acquired. The point cloud model of the target image is generated according to the first depth information. The initial depth information of the pixels in the target image in the second prediction layer is determined according to the point cloud model. Then, propagation optimization is performed according to the initial depth information to determine the second depth information of the pixels in the target image output by the second prediction layer. Since the initial depth information of the second prediction layer is developed based on the first depth information output by the first prediction layer, relatively complete and accurate initial depth information can be obtained, further making the second depth information obtained by performing propagation optimization on the initial depth information more complete and accurate. Compared with the related art in which only one prediction layer is provided for depth information prediction, at least two prediction layers are provided in the present disclosure. The depth information output by each prediction layer is used to assist prediction of a subsequent prediction layer so that the final predicted depth information of pixels in the image is more accurate and complete. That is, much depth information of pixels can be predicted, and the predicted depth information is more accurate.

Figure 2A:
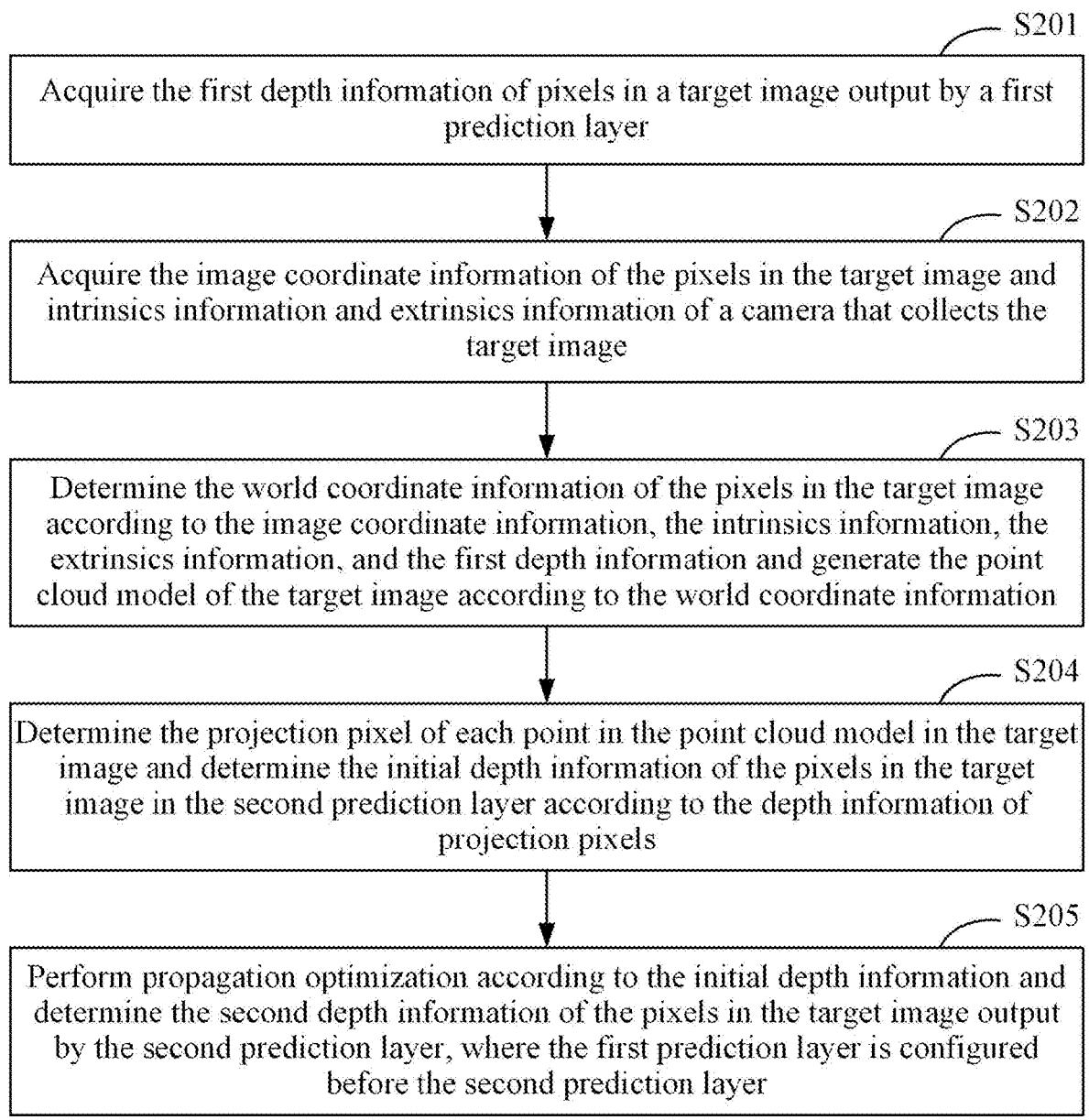
FIG. 2A is a flowchart of another method for determining image depth information according to an embodiment of the present disclosure.

FIG. 2A is a flowchart of another method for determining image depth information according to an embodiment of the present disclosure. The method is further optimized and extended based on the preceding solutions and may be combined with the preceding various optional embodiments.

As shown in FIG. 2A, the method for determining image depth information disclosed in this embodiment may include the following steps.

In S201, the first depth information of pixels in a target image output by a first prediction layer is acquired.

In S202, the image coordinate information of the pixels in the target image and intrinsics information and extrinsics information of a camera that collects the target image are acquired.

The image coordinate information of the pixels represents two-dimensional coordinates of the pixels in an image coordinate system. The intrinsics information represents intrinsic parameters of the camera, including, but not limited to, focal length, distortion coefficients, tangential distortion, radial distortion, and camera lens distortion. The extrinsics information includes position information and pose information in a world coordinate system when the camera photographs the target image.

In S203, the world coordinate information of the pixels in the target image is determined according to the image coordinate information, the intrinsics information, the extrinsics information, and the first depth information. The point cloud model of the target image is generated according to the world coordinate information.

In an embodiment, the world coordinate information of the pixels in the target image is determined by using the following equation: $Z \times W = K \times P \times V$.

Z denotes first depth information. W denotes image coordinate information. K denotes intrinsics information. P denotes extrinsics information. V denotes world coordinate information of a pixel.

After the world coordinate information of the pixels in the target image is determined, three-dimensional point cloud reconstruction is performed on each pixel according to the world coordinate information to obtain the point cloud model of the target image.

In S204, the projection pixel of each point in the point cloud model in the target image is determined. The initial depth information of the pixels in the target image in the second prediction layer is determined according to the depth information of projection pixels.

In an embodiment, each three-dimensional point in the point cloud model is projected into the target image to determine at least one projection pixel in the target image. The depth information of a projection pixel is the depth information of a three-dimensional point, corresponding to the projection pixel, in the point cloud model. Projection pixels are triangulated and performed linear interpolation in the target image to determine the initial depth information of the pixels in the target image in the second prediction layer.

Optionally, S204 includes steps A and B.

In step A, the projection pixels are triangulated in the target image. At least one triangular region formed by the projection pixels in the target image is determined.

The depth information of each point in the point cloud model is known. The depth information of a projection pixel is the same as the depth information of a point, corresponding to the projection pixel, in the point cloud model. Therefore, the projection pixels are pixels of known depth information in the target image. For pixels in the target image excluding the projection pixels, the depth information is unknown. Depth information of other pixels needs to be inferred from the projection pixels of known depth information.

In an embodiment, the projection pixels are triangulated in the target image to obtain at least one triangular region with the projection pixels as vertices and without intersection.

Figure 2B:
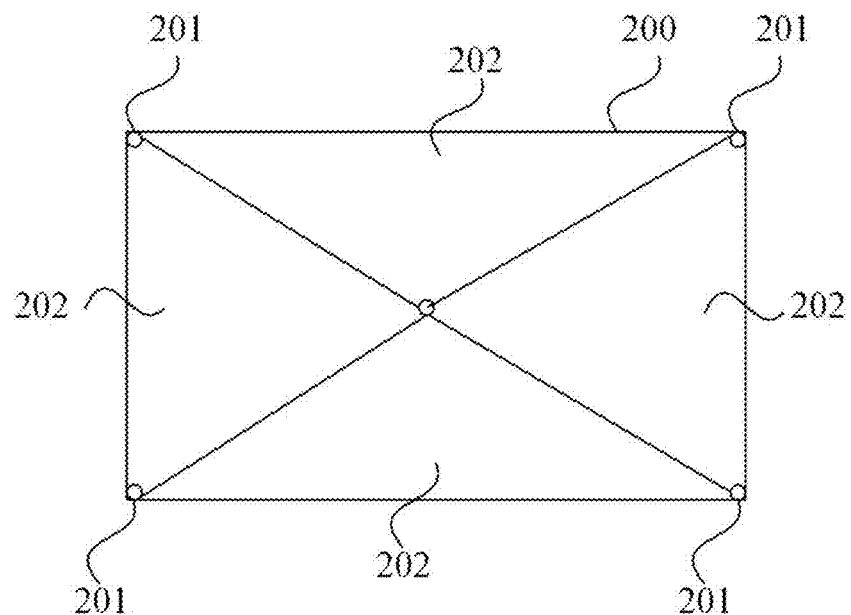
FIG. 2B is a diagram of triangulation according to an embodiment of the present disclosure.

Exemplarily, FIG. 2B is a diagram of triangulation according to an embodiment of the present disclosure. As shown in FIG. 2B, 200 represents a target image, and 201 represents projection pixels of the point cloud model of the target image in the target image. The projection pixels 201 are triangulated to determine at least one triangular region 202.

In step B, linear interpolation is performed on the pixels in the triangular region according to the depth information of the projection pixels. The initial depth information of the pixels in the target image in the second prediction layer is determined according to interpolation results.

In an embodiment, triangular regions formed by projection pixels in the target image are discretized to obtain pixels. The plane equation of the triangular regions is computed according to the depth information of the projection pixels. Then, the pixels are linearly interpolated to corresponding pixel coordinates. Each time a pixel is inserted, the corresponding initial depth information is computed. Thus, the initial depth information of the pixels in the target image in the second prediction layer is determined according to the interpolation results.

The projection pixels in the target image are triangulated. At least one triangular region formed by the projection pixels in the target image is determined. The pixels in the triangular region are performed linear interpolation according to the depth information of the projection pixels. The initial depth information of the pixels in the target image in the second prediction layer is determined according to the interpolation results. Thus, the effect of determining the initial depth information of the pixels in the target image according to the point cloud model of the target image is implemented, and a data foundation is laid for subsequent propagation optimization.

Figure 2C:
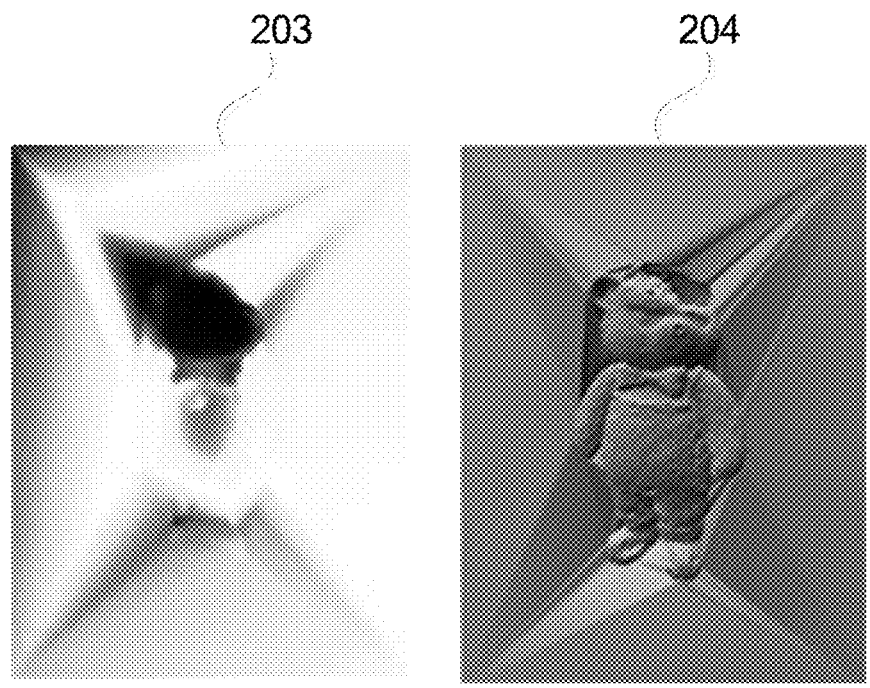
FIG. 2C is a diagram showing a comparison between some initial depth information according to an embodiment of the present disclosure.

FIG. 2C is a diagram showing a comparison between some initial depth information according to an embodiment of the present disclosure. As shown in FIG. 2C, 203 is an initial depth map generated according to the initial depth information of pixels in the target image in the first prediction layer. 204 is an initial depth map generated according to the initial depth information of pixels in the target image in the second prediction layer. Compared with the depth information of the pixels in the initial depth map of the first prediction layer, the depth information of the pixels in the initial depth map of the second prediction layer is more complete and accurate.

In S205, propagation optimization is performed according to the initial depth information, and the second depth information of the pixels in the target image output by the second prediction layer is determined. The first prediction layer is configured before the second prediction layer.

In the present disclosure, the image coordinate information of the pixels in the target image and the intrinsics information and extrinsics information of a camera that collects the target image are acquired. The world coordinate information of the pixels in the target image is determined according to the image coordinate information, the intrinsics information, the extrinsics information, and the first depth information. The point cloud model of the target image is generated according to the world coordinate information. Since the point cloud model of the target image is constructed based on the first depth information output by the first prediction layer, a more complete and accurate point cloud model can be acquired, further making the initial depth information determined according to the point cloud model more complete and accurate. The projection pixels of points in the point cloud model in the target image are determined. The initial depth information of the pixels in the target image in the second prediction layer is determined according to the depth information of the projection pixels. Thus, the effect of determining the initial depth information according to the point cloud model is implemented, and a data foundation is laid for subsequent propagation optimization according to the initial depth information.

Figure 3A:
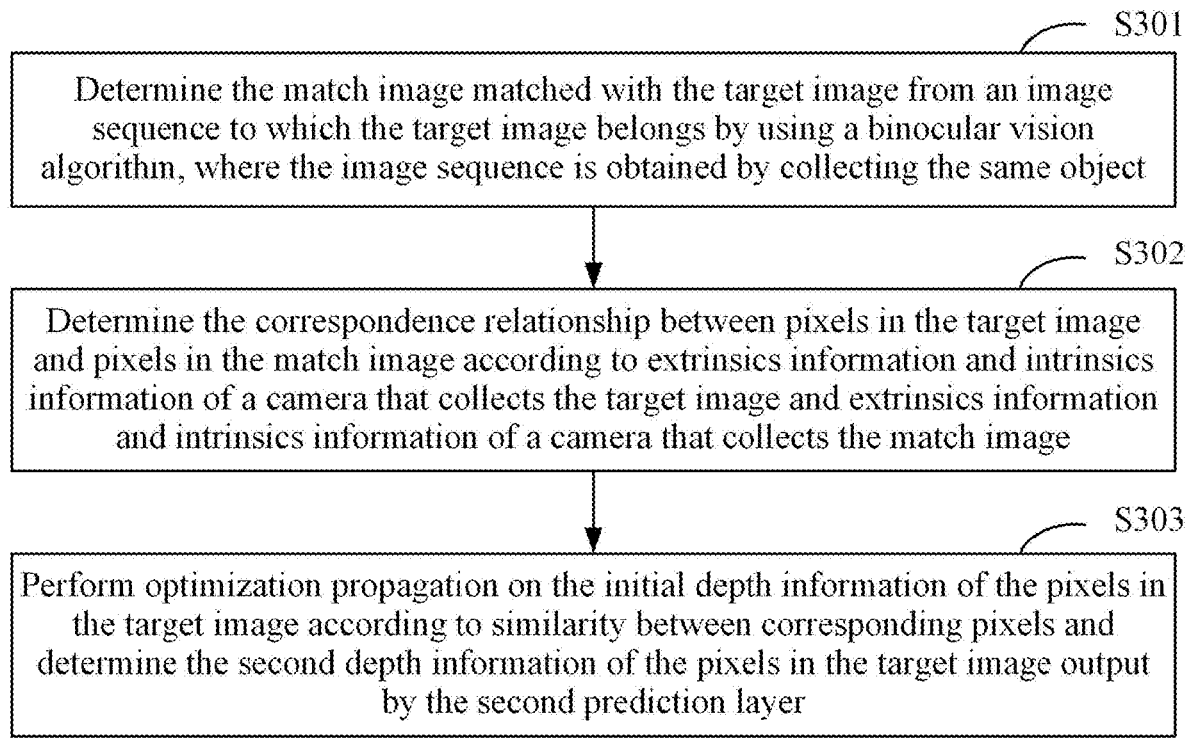
FIG. 3A is a flowchart of another method for determining image depth information according to an embodiment of the present disclosure.

FIG. 3A is a flowchart of another method for determining image depth information according to an embodiment of the present disclosure. "Performing propagation optimization according to the initial depth information and determining the second depth information of the pixels in the target image output by the second prediction layer" in the preceding solutions are performed further optimization and expansion and may be combined with the preceding optional embodiments.

As shown in FIG. 3A, the method for determining image depth information disclosed in this embodiment may include the following steps.

In S301, the match image matched with the target image is determined from an image sequence to which the target image belongs by using a binocular vision algorithm. The image sequence is obtained by collecting the same object.

Figure 3B:
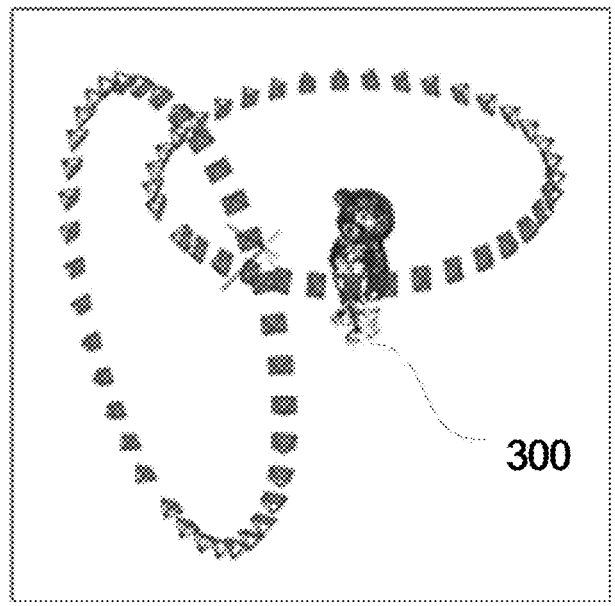
FIG. 3B is a diagram of image acquisition according to an embodiment of the present disclosure.

Images in the image sequence are obtained by collecting the same object by a camera through using different positions and poses. FIG. 3B is a diagram of image acquisition according to an embodiment of the present disclosure. As shown in FIG. 3B, each shade region around a target object 300 represents a corresponding position and pose when a camera is collecting.

In an embodiment, considering a camera as the human eye, the image collected by the camera in one position and pose and an image collected in another position and pose in the image sequence can form binocular vision. A binocular vision algorithm is used in the image sequence to match the target image with an image other than the target image. The image with the highest matching degree is used as a match image corresponding to the target image.

In S302, the correspondence relationship between pixels in the target image and pixels in the match image is determined according to extrinsics information and intrinsics information of a camera that collects the target image and extrinsics information and intrinsics information of a camera that collects the match image.

In an embodiment, since both the target image and the match image are obtained by collecting the same object, and the world coordinate information of the target object in a world coordinate system is fixed, the world coordinate information of the corresponding pixels in the target image and the match image is the same. Therefore, according to the image coordinate information of a pixel in the target image and the extrinsics information and intrinsics information of a camera that collects the target image, the world coordinate information of the pixel can be determined. Based on the world coordinate information and the extrinsics information and intrinsics information of a camera that collects the match image, a pixel in the match image corresponding to the pixel can be reversely deduced.

In S303, optimization propagation is performed on the initial depth information of the pixels in the target image according to similarity between corresponding pixels. The second depth information of the pixels in the target image output by the second prediction layer is determined.

The higher the similarity between the corresponding pixels in the target image and the match image, the more accurate the depth information indicating the pixels in the target image is. The similarity between the corresponding pixels in this embodiment can be determined according to a cost compute manner. A specific cost compute formula is not limited in this embodiment.

In an embodiment, the current initial depth information of a current pixel in the target image and the adjacent initial depth information of the adjacent pixel of the current pixel in the target image are determined. The match pixel in the match image corresponding to the current pixel is determined. Then, the similarity between the current pixel and the match pixel is determined when the current pixel has the current initial depth information and when the current pixel has the adjacent initial depth information. The second depth information of the current pixel output by the second prediction layer is determined according to the similarity.

Optionally, in S303, "performing optimization propagation on the initial depth information of the pixels in the target image according to similarity between corresponding pixels and determining the second depth information of the pixels in the target image output by the second prediction layer" includes the following steps.

In step A, a match pixel, which corresponds to a current pixel in the target image, in the match image is determined according to a correspondence relationship.

The current pixel may be any pixel in the target image.

In step B, the current initial depth information of the current pixel and the adjacent initial depth information of the adjacent pixel of the current pixel in the target image are determined.

The adjacent pixel may be a pixel located on the left or right side of the current pixel. In this embodiment, the number of iteration times of optimization propagation may be multiple. That is, the propagation may successively start downward in a shape of Z from the pixel in the upper left corner of the target image until the optimization propagation is completed once when the propagation is to the pixel in the lower right corner. Then, the second optimization propagation successively starts upward in a shape of Z from the pixel point in the lower right corner of the image. It can be seen that when the order of a propagation time is an odd number, the adjacent pixel is the pixel adjacent to the right side of the current pixel, and when the order of a propagation time is an even number, the adjacent pixel is the pixel adjacent to the left side of the current pixel.

In step C, the first similarity between the current pixel and the match pixel when the current pixel has the current initial depth information and the second similarity between the current pixel and the match pixel when the current pixel has the adjacent initial depth information are determined.

In an embodiment, the first similarity between the current pixel and the match pixel is determined by using the cost compute manner when the current initial depth information is assigned to the current pixel. The second similarity between the current pixel and the match pixel is determined by continuing using the cost compute manner when the adjacent initial depth information is assigned to the current pixel.

In step D, the second depth information of the current pixel output by the second prediction layer is determined according to the first similarity and the second similarity.

In an embodiment, the magnitudes of the first similarity and the second similarity are compared. The initial depth information with the greater similarity is selected as the second depth information of the current pixel output by the second prediction layer.

According to the correspondence relationship, a match pixel in the match image corresponding to the current pixel in the target image is determined, the current initial depth information of the current pixel and the adjacent initial depth information of the adjacent pixel of the current pixel in the target image are determined, and the first similarity between the current pixel and the match pixel when the current pixel has the current initial depth information and the second similarity between the current pixel and the match pixel when the current pixel has the adjacent initial depth information are determined. According to the first similarity and the second similarity, the second depth information of the current pixel output by the second prediction layer is determined, thereby implementing the effect of optimization propagation according to the similarity between corresponding pixels, and ensuring the accuracy of determining the second depth information.

Optionally, the step D includes the following steps.

In step D1, in the case where the first similarity is greater than the second similarity, the current initial depth information is used as the optimization depth information of the current pixel. In the case where the first similarity is less than the second similarity, the adjacent initial depth information is used as the optimization depth information of the current pixel.

Exemplarily, assuming that the first similarity is 0.9 and the second similarity is 0.8, the current initial depth information is used as the optimization depth information of the current pixel. Assuming that the first similarity is 0.8 and the second similarity is 0.9, the adjacent initial depth information is used as the optimization depth information of the current pixel.

In step D2, the second depth information of the current pixel output by the second prediction layer is determined according to the optimization depth information.

In an embodiment, the optimization depth information is directly used as the second depth information of the current pixel output by the second prediction layer.

In another embodiment, the optimization depth information is finely adjusted. The obtained adjustment depth information is used as the second depth information of the current pixel output by the second prediction layer.

In the case where the first similarity is greater than the second similarity, the current initial depth information is used as the optimization depth information of the current pixel. In the case where the first similarity is less than the second similarity, the adjacent initial depth information is used as the optimization depth information of the current pixel. The second depth information of the current pixel output by the second prediction layer is determined according to the optimization depth information. Therefore, the effect of performing propagation optimization according to the initial depth information is implemented, and the accuracy of determining the second depth information is improved.

Optionally, the step D2 includes the following steps.

In step D21, a depth information interval according to the optimization depth information is determined. At least one piece of adjustment depth information according to the depth information interval is determined.

In an embodiment, any value in a preset depth value range is added to an optimization depth value, and a random value in a preset depth direction range is added to an optimization depth direction. Then, a depth value interval and a depth direction interval are obtained and used as the depth information interval. All depth information in the depth information interval is used as adjustment depth information.

In step D22, the third similarity between the current pixel and the match pixel is determined when the current pixel is a piece of the adjustment depth information.

In an embodiment, the third similarity between the current pixel and the match pixel is determined by using a cost compute manner when each piece of adjustment depth information is assigned to the current pixel.

In D23, the second depth information of the current pixel output by the second prediction layer is determined according to the third similarity and each piece of the adjustment depth information.

In an embodiment, the adjustment depth information corresponding to the current pixel when the third similarity is maximum is selected as the second depth information of the current pixel output by the second prediction layer.

Exemplarily, assuming that when the current pixel is adjustment depth information A, adjustment depth information B, and adjustment depth information C, the third similarity between the current pixel and the match pixel is 0.9, 0.8, and 0.7, respectively. The adjustment depth information A is used as the second depth information of the current pixel output by the second prediction layer.

The depth information interval is determined according to the optimization depth information. At least one piece of adjustment depth information is determined according to the depth information interval. The third similarity between the current pixel and the match pixel is determined when the current pixel is each piece of adjustment depth information. Then, the second depth information of the current pixel output by the second prediction layer is determined according to the third similarity and each piece of adjustment depth information. Therefore, the effect of performing interval fine adjustment on the optimization depth information is implemented, further making the accuracy of the final output second depth information higher.

In the present disclosure, the match image matched with the target image is determined from an image sequence to which the target image belongs by using a binocular vision algorithm. The image sequence is obtained by collecting the same object. The correspondence relationship between the pixels in the target image and the pixels in the match image is determined according to the extrinsics information and intrinsics information of the camera that collects the target image and the extrinsics information and intrinsics information of the camera that collects the match image. Then, according to the similarity between the corresponding pixels, optimization propagation is performed on the initial depth information of the pixels in the target image, and the second depth information of the pixels in the target image output by the second prediction layer is determined. Thus, the optimization and adjustment of the initial depth information through optimization propagation is implemented, and the accuracy of the second depth information of the pixels in the target image output by the second prediction layer is improved.

Figure 3C:
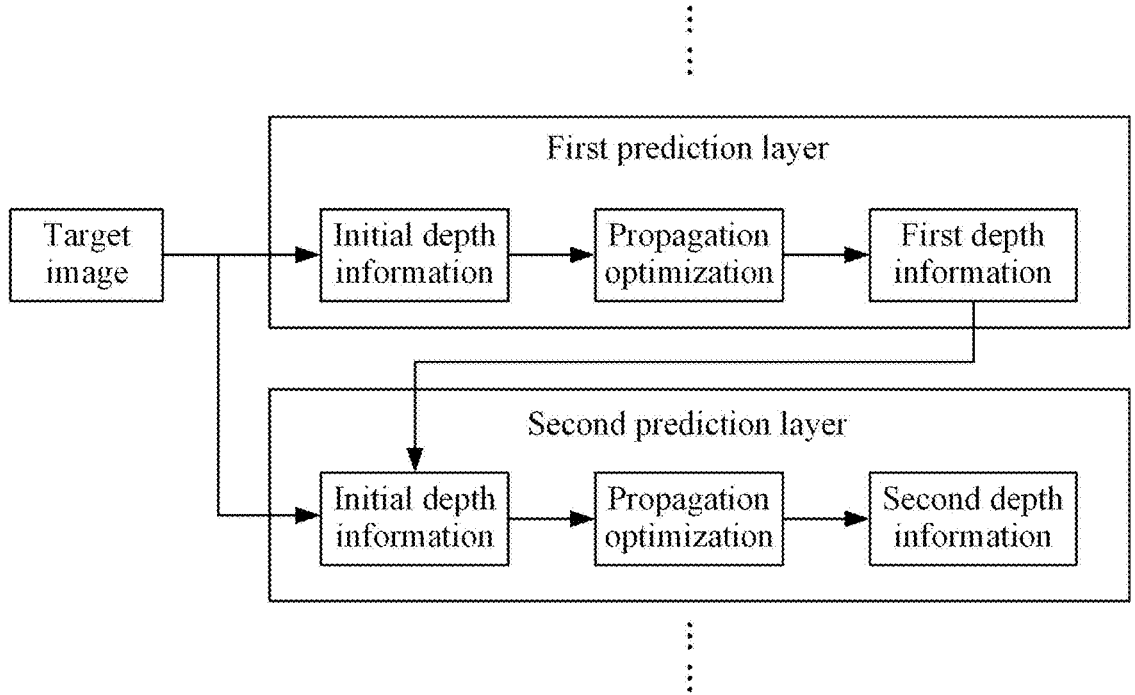
FIG. 3C is a diagram of some steps for determining image depth information according to an embodiment of the present disclosure.

FIG. 3C is a diagram of some steps for determining image depth information according to an embodiment of the present disclosure. As shown in FIG. 3C, in a first prediction layer, the initial depth information of pixels in an input target image is determined. Then, propagation optimization is performed on the initial depth information. Next, the first depth information of pixels in the target image output by the first prediction layer is determined.

In a second prediction layer, the initial depth information of pixels in the target image in the second prediction layer is determined according to the first depth information. Then, propagation optimization is performed on the initial depth information. Next, the second depth information of pixels in the target image output by the second prediction layer is determined.

Figure 3D:
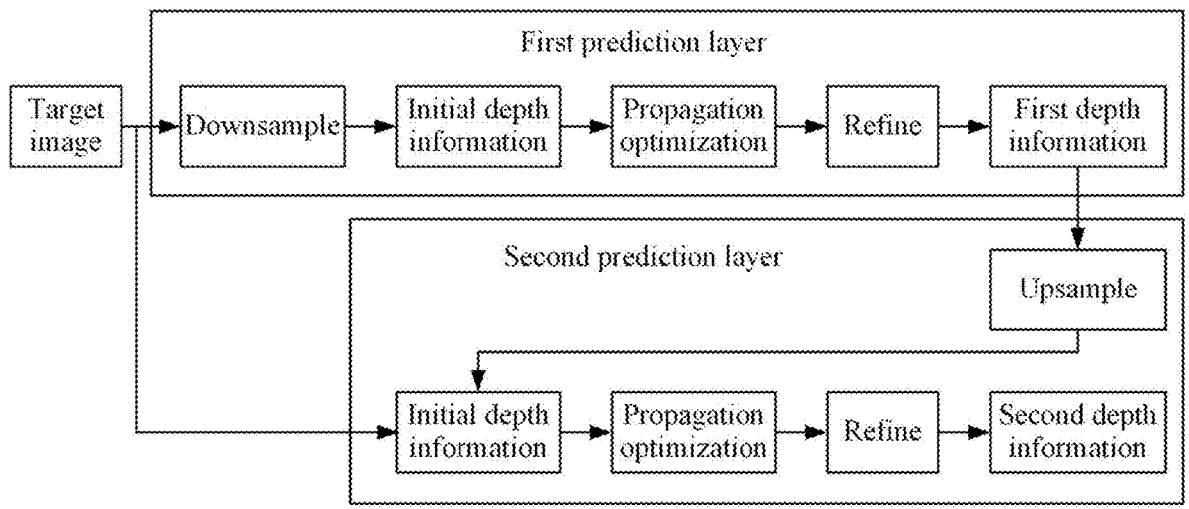
FIG. 3D is a diagram of some other steps for determining image depth information according to an embodiment of the present disclosure.

FIG. 3D is a diagram of some other steps for determining image depth information according to an embodiment of the present disclosure. As shown in FIG. 3D, if the prediction layer contains only two layers, in a first prediction layer, an input target image is first downsampled. The initial depth information of pixels in the target image after downsamping is determined. Then, propagation optimization is performed on the initial depth information. The propagation optimization result is refined through consistency check and parallax filling. Finally, the first depth information of pixels in the target image output by the first prediction layer is determined according to the refined result.

In a second prediction layer, the first depth information is first upsampled. The initial depth information of pixels in the target image in the second prediction layer is determined according to the first depth information after upsampling. Then, propagation optimization is performed on the initial depth information. The propagation optimization result is refined through consistency check and parallax filling. Finally, the second depth information of pixels in the target image output by the second prediction layer is determined according to the refined result.

By downsampling the target image input from the first prediction layer, the resolution of the target image can be reduced, thereby shortening the operation time of the first prediction layer. By upsampling the first depth information output by the first prediction layer, the accuracy of the second depth information can be improved. The propagation optimization result is refined through consistency checking and parallax filling so that the first depth information and the second depth information are more accurate, relevant, and complete.

The specific implementation of the preceding steps is shown in the description of the method embodiments of the present disclosure, and details are not described here again.

Figure 4:
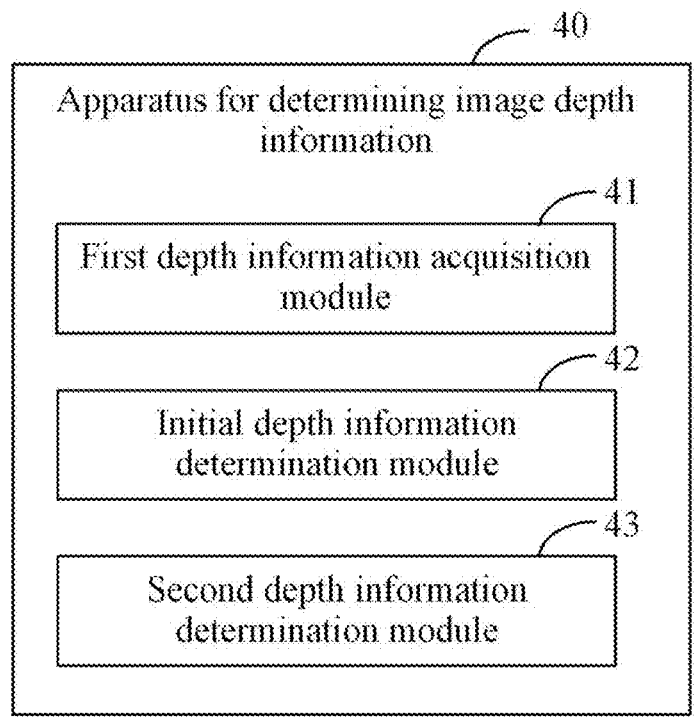
FIG. 4 is a diagram illustrating the structure of an apparatus for determining image depth information according to an embodiment of the present disclosure.

FIG. 4 is a diagram illustrating the structure of an apparatus for determining image depth information according to an embodiment of the present disclosure. This embodiment may be applied in the case of determining depth information for each pixel in an image. The apparatus in this embodiment may be implemented by software and/or hardware and integrated in any electronic device having a computing capability.

As shown in FIG. 4, an apparatus 40 for determining image depth information disclosed in this embodiment may include a first depth information acquisition module 41, an initial depth information determination module 42, and a second depth information determination module 43.

The first depth information acquisition module 41 is configured to acquire the first depth information of pixels in a target image output by a first prediction layer.

The initial depth information determination module 42 is configured to generate the point cloud model of the target image according to the first depth information and determine the initial depth information of the pixels in the target image in a second prediction layer according to the point cloud model.

The second depth information determination module 43 is configured to perform propagation optimization according to the initial depth information and determine the second depth information of the pixels in the target image output by the second prediction layer.

The first prediction layer is configured before the second prediction layer.

Optionally, the initial depth information determination module 42 is specifically configured to acquire the image coordinate information of the pixels in the target image and the intrinsics information and extrinsics information of a camera that collects the target image, determine the world coordinate information of the pixels in the target image according to the image coordinate information, the intrinsics information, the extrinsics information, and the first depth information, and generate the point cloud model of the target image according to the world coordinate information.

Optionally, the initial depth information determination module 42 is further specifically configured to determine the projection pixel of each point in the point cloud model in the target image and determine the initial depth information of the pixels in the target image in the second prediction layer according to the depth information of the projection pixel.

Optionally, the initial depth information determination module 42 is further specifically configured to triangulate projection pixels in the target image and determine at least one triangular region formed by the projection pixels in the target image, perform linear interpolation on the pixels in the triangular region according to the depth information of the projection pixels, and determine the initial depth information of the pixels in the target image in the second prediction layer according to interpolation results.

Optionally, the second depth information determination module 43 is specifically configured to determine the match image matched with the target image from an image sequence to which the target image belongs by using a binocular vision algorithm, where the image sequence is obtained by collecting the same object, determine the correspondence relationship between the pixels in the target image and pixels in the match image according to the extrinsics information and intrinsics information of a camera that collects the target image and the extrinsics information and intrinsics information of a camera that collects the match image, perform optimization propagation on the initial depth information of the pixels in the target image according to similarity between corresponding pixels, and determine the second depth information of the pixels in the target image output by the second prediction layer.

Optionally, the second depth information determination module 43 is further specifically configured to determine a match pixel, which corresponds to a current pixel in the target image, in the match image according to the correspondence relationship, determine the current initial depth information of the current pixel and the adjacent initial depth information of the adjacent pixel of the current pixel in the target image, determine the first similarity between the current pixel and the match pixel when the current pixel has the current initial depth information and the second similarity between the current pixel and the match pixel when the current pixel has the adjacent initial depth information, and determine the second depth information of the current pixel output by the second prediction layer according to the first similarity and the second similarity.

Optionally, the second depth information determination module 43 is further specifically configured to in the case where the first similarity is greater than the second similarity, use the current initial depth information as the optimization depth information of the current pixel, and in the case where the first similarity is less than the second similarity, use the adjacent initial depth information as the optimization depth information of the current pixel; and determine the second depth information of the current pixel output by the second prediction layer according to the optimization depth information.

Optionally, the second depth information determination module 43 is further specifically configured to determine a depth information interval according to the optimization depth information and at least one piece of adjustment depth information according to the depth information interval, determine the third similarity between the current pixel and the match pixel when the current pixel has each piece of the adjustment depth information, and determine the second depth information of the current pixel output by the second prediction layer according to the third similarity and the each piece of the adjustment depth information.

The apparatus 40 for determining image depth information disclosed in this embodiment of the present disclosure can perform the method for determining image depth information disclosed in the embodiments of the present disclosure and has function modules and beneficial effects corresponding to the performed method. For content not described in detail in this embodiment, reference may be made to description in method embodiments of the present disclosure.

Operations, including acquisition, storage, and application, on a user's personal information involved in the solutions of the present disclosure conform to relevant laws and regulations and do not violate the public policy doctrine.

According to an embodiment of the present disclosure, the present disclosure further provides an electronic device, a readable storage medium, and a computer program product.

Figure 5:
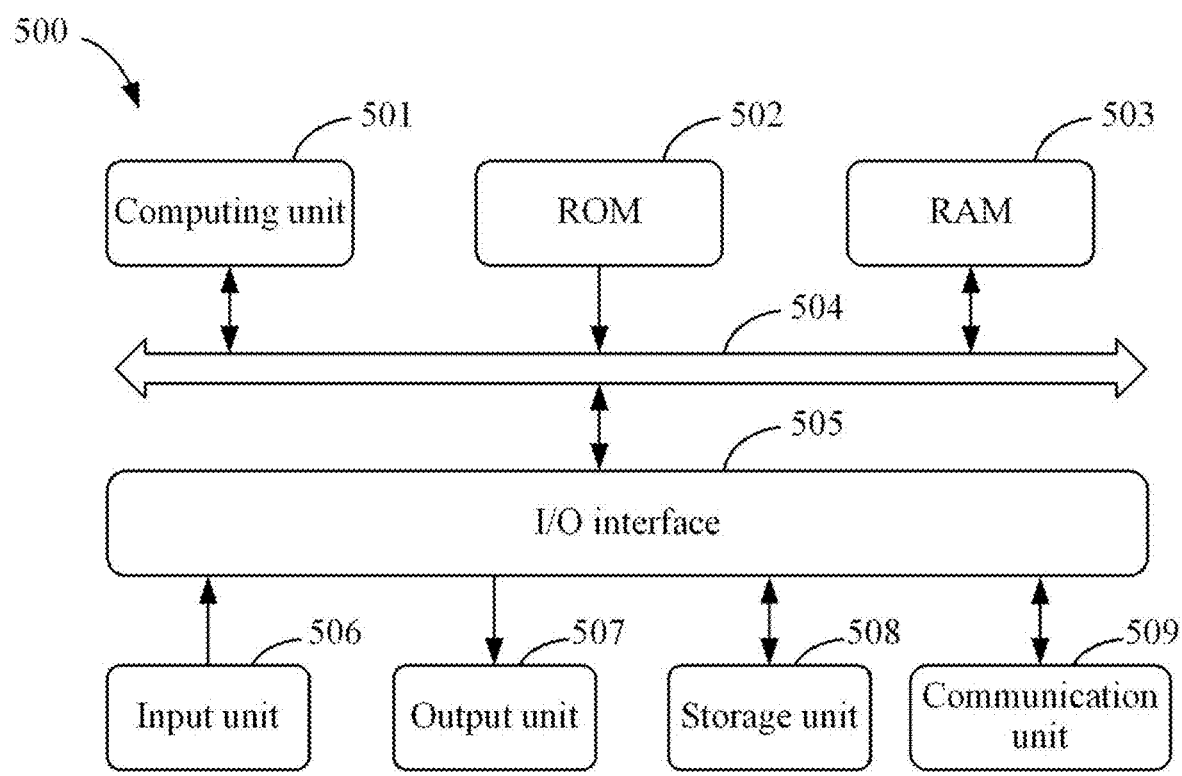
FIG. 5 is a block diagram of an electronic device that may be configured to implement a method for determining image depth information according to an embodiment of the present disclosure.

FIG. 5 is a block diagram of an example electronic device 500 that may be configured to implement an embodiment of the present disclosure. The electronic device is intended to represent various forms of digital computers, for example, a laptop computer, a desktop computer, a workbench, a personal digital assistant, a server, a blade server, a mainframe computer, or another applicable computer. The electronic device may also represent various forms of mobile apparatuses, for example, a personal digital assistant, a cellphone, a smartphone, a wearable device, or a similar computing apparatus. Herein the shown components, the connections and relationships between these components, and the functions of these components are illustrative only and are not intended to limit the implementation of the present disclosure as described and/or claimed herein.

As shown in FIG. 5, the device 500 includes a computing unit 501. The computing unit 501 may perform various appropriate actions and processing according to a computer program stored in a read-only memory (ROM) 502 or a computer program loaded into a random-access memory (RAM) 503 from a storage unit 508. Various programs and data required for the operation of the device 500 may also be stored in the RAM 503. The computing unit 501, the ROM 502, and the RAM 503 are connected to each other through a bus 504. An input/output (I/O) interface 505 is also connected to the bus 504.

Multiple components in the device 500 are connected to the I/O interface 505. The multiple components include an input unit 506 such as a keyboard or a mouse, an output unit 507 such as various types of displays or speakers, the storage unit 508 such as a magnetic disk or an optical disc, and a communication unit 509 such as a network card, a modem, or a wireless communication transceiver. The communication unit 509 allows the device 500 to exchange information/data with other devices over a computer network such as the Internet and/or various telecommunications networks.

The computing unit 501 may be various general-purpose and/or special-purpose processing components having processing and computing capabilities. Examples of the computing unit 501 include, but are not limited to, a central processing unit (CPU), a graphics processing unit (GPU), a special-purpose artificial intelligence (AI) computing chip, a computing unit executing machine learning models and algorithms, a digital signal processor (DSP), and any appropriate processor, controller, and microcontroller. The computing unit 501 performs the preceding various methods and processing such as the method for determining image depth information. For example, in some embodiments, the method for determining image depth information may be implemented as computer software programs tangibly contained in a machine-readable medium such as the storage unit 508. In some embodiments, part or all of computer programs may be loaded and/or installed on the device 500 via the ROM 502 and/or the communication unit 509. When the computer program is loaded to the RAM 503 and executed by the computing unit 501, one or more steps of the preceding method for determining image depth information may be performed. Alternatively, in other embodiments, the computing unit 501 may be configured, in any other suitable manner (for example, by relying on firmware), to perform the method for determining image depth information.

Herein various embodiments of the preceding systems and techniques may be implemented in digital electronic circuitry, integrated circuitry, field-programmable gate arrays (FPGAs), application-specific integrated circuits (ASICs), application-specific standard products (ASSPs), systems on chips (SoCs), complex programmable logic devices (CPLDs), computer hardware, firmware, software, and/or combinations thereof. The various embodiments may include implementations in one or more computer programs. The one or more computer programs are executable and/or interpretable on a programmable system including at least one programmable processor. The programmable processor may be a special-purpose or general-purpose programmable processor for receiving data and instructions from a memory system, at least one input apparatus, and at least one output apparatus and transmitting data and instructions to the memory system, the at least one input apparatus, and the at least one output apparatus.

Program codes for implementation of the methods of the present disclosure may be written in one programming language or any combination of multiple programming languages. The program codes may be provided for the processor or controller of a general-purpose computer, a special-purpose computer, or another programmable data processing apparatus to enable functions/operations specified in flowcharts and/or block diagrams to be implemented when the program codes are executed by the processor or controller. The program codes may be executed entirely on a machine or may be executed partly on a machine. As a stand-alone software package, the program codes may be executed partly on a machine and partly on a remote machine or may be executed entirely on a remote machine or a server.

In the context of the present disclosure, the machine-readable medium may be a tangible medium that may include or store a program that is used by or used in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. More specific examples of the machine-readable storage medium may include an electrical connection based on one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), an optical storage device, a magnetic storage device, or any suitable combination thereof.

In order that interaction with a user is provided, the systems and techniques described herein may be implemented on a computer. The computer has a display apparatus (for example, a cathode-ray tube (CRT) or a liquid-crystal display (LCD) monitor) for displaying information to the user and a keyboard and a pointing apparatus (for example, a mouse or a trackball) through which the user can provide input to the computer. Other types of apparatuses may also be used for providing interaction with a user. For example, feedback provided for the user may be sensory feedback in any form (for example, visual feedback, auditory feedback, or haptic feedback). Moreover, input from the user may be received in any form (including acoustic input, voice input, or haptic input).

The systems and techniques described herein may be implemented in a computing system including a back-end component (for example, a data server), a computing system including a middleware component (for example, an application server), a computing system including a front-end component (for example, a client computer having a graphical user interface or a web browser through which a user can interact with implementations of the systems and techniques described herein), or a computing system including any combination of such back-end, middleware, or front-end components. Components of a system may be interconnected by any form or medium of digital data communication (for example, a communication network). Examples of the communication network include a local area network (LAN), a wide area network (WAN), a blockchain network, and the Internet.

A computing system may include a client and a server. The client and the server are usually far away from each other and generally interact through the communication network. The relationship between the client and the server arises by virtue of computer programs running on respective computers and having a client-server relationship to each other. The server may be a cloud server, also referred to as a cloud computing server or a cloud host. As a host product in a cloud computing service system, the server solves the defects of difficult management and weak service scalability in a related physical host and a related virtual private server (VPS).

It is to be understood that various forms of the preceding flows may be used with steps reordered, added, or removed. For example, the steps described in the present disclosure may be executed in parallel, in sequence or in a different order as long as the desired results of the solutions disclosed in the present disclosure can be implemented. The execution sequence of these steps is not limited herein.

The scope of the present disclosure is not limited to the preceding embodiments. It is to be understood by those skilled in the art that various modifications, combinations, subcombinations, and substitutions may be made according to design requirements and other factors. Any modification, equivalent substitution, improvement and the like made within the spirit and principle of the present disclosure falls within the scope of the present disclosure.

What is claimed is:

1. A method for determining image depth information, comprising:
   acquiring first depth information of pixels in a target image output by a first prediction layer;
   generating a point cloud model of the target image according to the first depth information, and determining initial depth information of the pixels in the target image in a second prediction layer according to the point cloud model; and
   performing propagation optimization according to the initial depth information, and determining second depth information of the pixels in the target image output by the second prediction layer,
   wherein the first prediction layer is configured before the second prediction layer,
   wherein the performing propagation optimization according to the initial depth information, and determining the second depth information of the pixels in the target image output by the second prediction layer comprises:
   determining a match image matched with the target image from an image sequence to which the target image belongs by using a binocular vision algorithm, wherein the image sequence is obtained by collecting a same object;
   determining a correspondence relationship between the pixels in the target image and pixels in the match image according to extrinsics information and intrinsics information of a camera that collects the target image and extrinsics information and intrinsics information of a camera that collects the match image; and
   performing optimization propagation on the initial depth information of the pixels in the target image according to similarity between corresponding pixels, and determining the second depth information of the pixels in the target image output by the second prediction layer.

2. The method according to claim 1, wherein generating the point cloud model of the target image according to the first depth information comprises:
   acquiring image coordinate information of the pixels in the target image and intrinsics information and extrinsics information of a camera that collects the target image; and
   determining world coordinate information of the pixels in the target image according to the image coordinate information, the intrinsics information, the extrinsics information, and the first depth information, and generating the point cloud model of the target image according to the world coordinate information.

3. The method according to claim 1, wherein the determining the initial depth information of the pixels in the target image in the second prediction layer according to the point cloud model comprises:
   determining a projection pixel of each point in the point cloud model in the target image; and
   determining the initial depth information of the pixels in the target image in the second prediction layer according to depth information of projection pixels.

4. The method according to claim 3, wherein the determining the initial depth information of the pixels in the target image in the second prediction layer according to the depth information of the projection pixels comprises:
   triangulating the projection pixels in the target image, and determining at least one triangular region formed by the projection pixels in the target image; and
   performing linear interpolation on the pixels in the at least one triangular region according to the depth information of the projection pixels, and determining the initial depth information of the pixels in the target image in the second prediction layer according to interpolation results.

5. The method according to claim 1, wherein the performing optimization propagation on the initial depth information of the pixels in the target image according to the similarity between corresponding pixels and determining the second depth information of the pixels in the target image output by the second prediction layer comprises:
   determining a match pixel, which corresponds to a current pixel in the target image, in the match image according to the correspondence relationship;
   determining current initial depth information of the current pixel and adjacent initial depth information of an adjacent pixel of the current pixel in the target image;
   determining first similarity between the current pixel and the match pixel when the current pixel has the current initial depth information and second similarity between the current pixel and the match pixel when the current pixel has the adjacent initial depth information; and
   determining second depth information of the current pixel output by the second prediction layer according to the first similarity and the second similarity.

6. The method according to claim 5, wherein determining the second depth information of the current pixel output by the second prediction layer according to the first similarity and the second similarity comprises:
   in a case where the first similarity is greater than the second similarity, using the current initial depth information as optimization depth information of the current pixel, and in a case where the first similarity is less than the second similarity, using the adjacent initial depth information as optimization depth information of the current pixel; and
   determining the second depth information of the current pixel output by the second prediction layer according to the optimization depth information.

7. The method according to claim 6, wherein the determining the second depth information of the current pixel output by the second prediction layer according to the optimization depth information comprises:

determining a depth information interval according to the optimization depth information, and determining at least one piece of adjustment depth information according to the depth information interval;

determining third similarity between the current pixel and the match pixel when the current pixel has each piece of the adjustment depth information; and determining the second depth information of the current pixel output by the second prediction layer according to the third similarity and the each piece of the adjustment depth information.

8. An electronic device, comprising:

at least one processor; and a memory communicatively connected to the at least one processor, wherein the memory stores instructions executable by the at least one processor to enable the at least one processor to execute a method for determining image depth information, wherein the method comprises:

acquiring first depth information of pixels in a target image output by a first prediction layer;

generating a point cloud model of the target image according to the first depth information, and determining initial depth information of the pixels in the target image in a second prediction layer according to the point cloud model; and performing propagation optimization according to the initial depth information, and determining second depth information of the pixels in the target image output by the second prediction layer, wherein the first prediction layer is configured before the second prediction layers;

wherein the performing propagation optimization according to the initial depth information, and determining the second depth information of the pixels in the target image output by the second prediction layer comprises:

determining a match image matched with the target image from an image sequence to which the target image belongs by using a binocular vision algorithm, wherein the image sequence is obtained by collecting a same object;

determining a correspondence relationship between the pixels in the target image and pixels in the match image according to extrinsics information and intrinsics information of a camera that collects the target image and extrinsics information and intrinsics information of a camera that collects the match image; and performing optimization propagation on the initial depth information of the pixels in the target image according to similarity between corresponding pixels, and determining the second depth information of the pixels in the target image output by the second prediction layer.

9. The electronic device according to claim 8, wherein generating the point cloud model of the target image according to the first depth information comprises:

acquiring image coordinate information of the pixels in the target image and intrinsics information and extrinsics information of a camera that collects the target image; and determining world coordinate information of the pixels in the target image according to the image coordinate information, the intrinsics information, the extrinsics information, and the first depth information, and generating the point cloud model of the target image according to the world coordinate information.

10. The electronic device according to claim 8, wherein the determining the initial depth information of the pixels in the target image in the second prediction layer according to the point cloud model comprises:

determining a projection pixel of each point in the point cloud model in the target image; and determining the initial depth information of the pixels in the target image in the second prediction layer according to depth information of projection pixels.

11. The electronic device according to claim 10, wherein the determining the initial depth information of the pixels in the target image in the second prediction layer according to the depth information of the projection pixels comprises:

triangulating the projection pixels in the target image, and determining at least one triangular region formed by the projection pixels in the target image; and performing linear interpolation on the pixels in the at least one triangular region according to the depth information of the projection pixels, and determining the initial depth information of the pixels in the target image in the second prediction layer according to interpolation results.

12. The electronic device according to claim 8, wherein the performing optimization propagation on the initial depth information of the pixels in the target image according to the similarity between corresponding pixels and determining the second depth information of the pixels in the target image output by the second prediction layer comprises:

determining a match pixel, which corresponds to a current pixel in the target image, in the match image according to the correspondence relationship;

determining current initial depth information of the current pixel and adjacent initial depth information of an adjacent pixel of the current pixel in the target image;

determining first similarity between the current pixel and the match pixel when the current pixel has the current initial depth information and second similarity between the current pixel and the match pixel when the current pixel has the adjacent initial depth information; and determining second depth information of the current pixel output by the second prediction layer according to the first similarity and the second similarity.

13. The electronic device according to claim 12, wherein determining the second depth information of the current pixel output by the second prediction layer according to the first similarity and the second similarity comprises:

in a case where the first similarity is greater than the second similarity, using the current initial depth information as optimization depth information of the current pixel, and in a case where the first similarity is less than the second similarity, using the adjacent initial depth information as optimization depth information of the current pixel; and determining the second depth information of the current pixel output by the second prediction layer according to the optimization depth information.

14. The electronic device according to claim 13, wherein the determining the second depth information of the current pixel output by the second prediction layer according to the optimization depth information comprises:

determining a depth information interval according to the optimization depth information, and determining at least one piece of adjustment depth information according to the depth information interval;

determining third similarity between the current pixel and the match pixel when the current pixel has each piece of the adjustment depth information; and determining the second depth information of the current pixel output by the second prediction layer according to the third similarity and the each piece of the adjustment depth information.

15. A non-transitory computer-readable storage medium storing computer instructions for causing a computer to execute a method for determining image depth information, wherein the method comprises:

acquiring first depth information of pixels in a target image output by a first prediction layer;

generating a point cloud model of the target image according to the first depth information, and determining initial depth information of the pixels in the target image in a second prediction layer according to the point cloud model; and performing propagation optimization according to the initial depth information, and determining second depth information of the pixels in the target image output by the second prediction layer, wherein the first prediction layer is configured before the second prediction layers;

wherein the performing propagation optimization according to the initial depth information, and determining the second depth information of the pixels in the target image output by the second prediction layer comprises:

determining a match image matched with the target image from an image sequence to which the target image belongs by using a binocular vision algorithm, wherein the image sequence is obtained by collecting a same object;

determining a correspondence relationship between the pixels in the target image and pixels in the match image according to extrinsics information and intrinsics information of a camera that collects the target image and extrinsics information and intrinsics information of a camera that collects the match image; and performing optimization propagation on the initial depth information of the pixels in the target image according to similarity between corresponding pixels, and determining the second depth information of the pixels in the target image output by the second prediction layer.

16. The non-transitory computer-readable storage medium according to claim 15, wherein generating the point cloud model of the target image according to the first depth information comprises:

acquiring image coordinate information of the pixels in the target image and intrinsics information and extrinsics information of a camera that collects the target image; and determining world coordinate information of the pixels in the target image according to the image coordinate information, the intrinsics information, the extrinsics information, and the first depth information, and generating the point cloud model of the target image according to the world coordinate information.

17. The non-transitory computer-readable storage medium according to claim 15, wherein the determining the initial depth information of the pixels in the target image in the second prediction layer according to the point cloud model comprises:

determining a projection pixel of each point in the point cloud model in the target image; and determining the initial depth information of the pixels in the target image in the second prediction layer according to depth information of projection pixels.

18. The non-transitory computer-readable storage medium according to claim 17, wherein the determining the initial depth information of the pixels in the target image in the second prediction layer according to the depth information of the projection pixels comprises:

triangulating the projection pixels in the target image, and determining at least one triangular region formed by the projection pixels in the target image; and performing linear interpolation on the pixels in the at least one triangular region according to the depth information of the projection pixels, and determining the initial depth information of the pixels in the target image in the second prediction layer according to interpolation results.

* * * * *